US010995822B2

(12) United States Patent
Smook

(10) Patent No.: US 10,995,822 B2
(45) Date of Patent: May 4, 2021

(54) SERIES OF GEARBOXES

(71) Applicants: ZF Friedrichshafen AG, Friedrichshafen (DE); ZF Wind Power Antwerpen N.V., Lommel (BE)

(72) Inventor: Warren Smook, Huldenberg (BE)

(73) Assignees: ZF Friedrichshafen AG, Friedrichshafen (DE); ZF Wind Power Antwerpen N.V., Lommel (BE)

( * ) Notice: Subject to any disclaimer, the term of this patent is extended or adjusted under 35 U.S.C. 154(b) by 99 days.

(21) Appl. No.: 16/482,262

(22) PCT Filed: Jan. 30, 2018

(86) PCT No.: PCT/EP2018/052215
§ 371 (c)(1),
(2) Date: Jul. 31, 2019

(87) PCT Pub. No.: WO2018/141715
PCT Pub. Date: Aug. 9, 2018

(65) Prior Publication Data
US 2019/0390737 A1 Dec. 26, 2019

(30) Foreign Application Priority Data

Feb. 3, 2017 (DE) ...................... 10 2017 201 738.4

(51) Int. Cl.
*F16H 1/46* (2006.01)
*F03D 15/00* (2016.01)
(Continued)

(52) U.S. Cl.
CPC ............... *F16H 1/46* (2013.01); *F03D 15/00* (2016.05); *F03D 80/70* (2016.05); *F16H 55/17* (2013.01);
(Continued)

(58) Field of Classification Search
CPC ...................................................... F16H 1/46
See application file for complete search history.

(56) References Cited

U.S. PATENT DOCUMENTS

| 5,651,747 A * | 7/1997 | Minegishi ................ F16H 1/32 475/176 |
| 7,147,582 B2 * | 12/2006 | Mingishi ................. F16H 1/32 475/163 |
| 7,351,177 B2 * | 4/2008 | Christ ...................... F16H 1/32 475/168 |

FOREIGN PATENT DOCUMENTS

| DE | 4202199 A1 | 7/1993 |
| DE | 10028046 A1 | 12/2001 |

(Continued)

*Primary Examiner* — Derek D Knight
(74) *Attorney, Agent, or Firm* — Leydig, Voit & Mayer, Ltd.

(57) ABSTRACT

A series of transmissions includes a first transmission, a second transmission, a third transmission, and a fourth transmission. Each of the first, second, third and fourth transmissions has a first planetary stage and a second planetary stage. The first planetary stage and the second planetary stage in each case have an internal gear, a sun gear, a planetary carrier, and one or more planetary gears. The planetary carriers of the first planetary stages of the first transmission and of the second transmission are structurally identical. The planetary carriers of the first planetary stages of the third transmission and of the fourth transmission are structurally identical. A width of teeth of the planetary gears of the first planetary stage of the first transmission is smaller than a width of teeth of the planetary gears of the first planetary stage of the second transmission.

17 Claims, 1 Drawing Sheet

(51) Int. Cl.
  *F03D 80/70* (2016.01)
  *F16H 55/17* (2006.01)
  *F16H 57/08* (2006.01)
(52) U.S. Cl.
  CPC ....... *F16H 57/08* (2013.01); *F16H 2057/085* (2013.01)

(56) References Cited

FOREIGN PATENT DOCUMENTS

| | | | |
|---|---|---|---|
| DE | 102007034449 A1 | 1/2009 | |
| DE | 10123548 A1 | 12/2011 | |
| DE | 102010022072 A1 | 12/2011 | |
| DE | 102014226007 A1 | 6/2016 | |
| EP | 2554839 A1 | 2/2013 | |
| WO | 2016074991 A1 | 5/2016 | |
| WO | WO-2016074991 A1 * | 5/2016 | ............... F16H 1/46 |

* cited by examiner

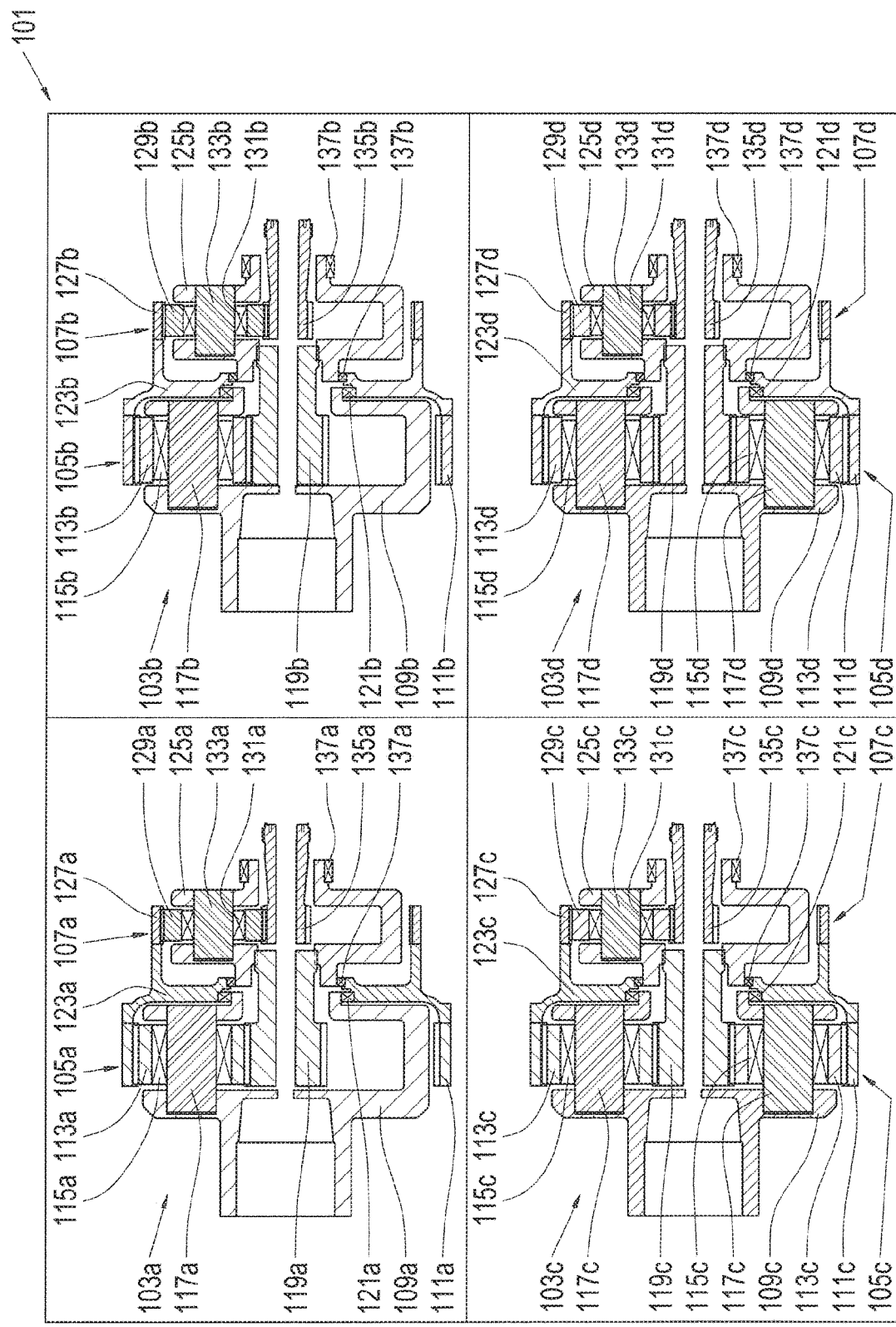

SERIES OF GEARBOXES

CROSS REFERENCE TO RELATED APPLICATIONS

This application is a U.S. National Stage Application under 35 U.S.C. § 371 of International Application No. PCT/EP2018/052215 filed on Jan. 30, 2018, and claims benefit to German Patent Application No. DE 10 2017 201 738.4 filed on Feb. 3, 2017. The International Application was published in German on Aug. 9, 2018 as WO 2018/141715 A1 under PCT Article 21(2).

BACKGROUND

The invention relates to a series of transmissions, the series including a first transmission and a second transmission, wherein the transmissions in each case have a first planetary stage and a second planetary stage.

FIELD

The design and manufacture of transmissions requires considerable input of capital and resources. Many suppliers therefore aim to cover as many applications as possible with one single type of transmission. This, however, leads to transmissions being oversized for applications with low loads. An oversized transmission, in turn, offers potential for cost savings.

SUMMARY

In an embodiment, the present invention provides a series of transmissions. The series of transmissions includes a first transmission, a second transmission, a third transmission, and a fourth transmission. Each of the first, second, third and fourth transmissions has a first planetary stage and a second planetary stage. The first planetary stage and the second planetary stage in each case have an internal gear, a sun gear, a planetary carrier, and one or more planetary gears. The planetary carriers of the first planetary stages of the first transmission and of the second transmission are structurally identical. The planetary carriers of the first planetary stages of the third transmission and of the fourth transmission are structurally identical. A width of teeth of the planetary gears of the first planetary stage of the first transmission is smaller than a width of teeth of the planetary gears of the first planetary stage of the second transmission. A number of the planetary gears of the first planetary stage of the first transmission is smaller than a number of planetary gears of the first planetary stage of the third transmission. A width of teeth of the planetary gears of the first planetary stage of the third transmission is smaller than a width of teeth of the planetary gears of the first planetary stage of the fourth transmission.

BRIEF DESCRIPTION OF THE DRAWINGS

The present invention will be described in even greater detail below based on the exemplary FIGURES. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

The FIGURE illustrates a transmission series according to an embodiment of the invention.

DETAILED DESCRIPTION

Against this background, it is appropriate to develop a transmission series. On the one hand, a series makes it possible to use components in various different transmissions of the series. On the other hand, the transmissions of the series can be adapted to specific applications. Both possibilities have a cost-saving effect.

In the field of wind turbines, however, customary types of transmission series have so far not been able to prevail. The use of series is difficult here, because turbine manufacturer specifications for the interfaces between the turbine and the transmission vary widely. Furthermore, the range of load conditions that has to be met also varies widely.

Embodiments of the present invention make available transmissions for wind turbines while avoiding the disadvantages inherent in the solutions known from the prior art. A particular aim is to reduce costs without impairing technical features.

A series is defined as a plurality of individual apparatuses. The series according to the invention consists of transmissions, preferably transmissions for wind turbines, and comprises at least a first transmission and a second transmission.

Each transmission of the series has a first planetary stage and a second planetary stage. A planetary stage is a transmission stage with an internal gear, a sun gear, a planetary carrier, and one or more, preferably structurally identical, planetary gears. The planetary gears are mounted rotatably in the planetary carrier and in each case intermesh with the internal gear and/or with the sun gear. Any two of the three components sun gear, planetary carrier, and internal gear are mounted rotatably. The third component is disposed non-rotatably.

The planetary carrier of the first planetary stage of the first transmission and the planetary carrier of the first planetary stage of the second transmission are structurally identical. Thus, for example, the number of planets that can be accommodated in the planetary carrier of the first planetary stage of the first transmission and in the planetary carrier of the first planetary stage of the second transmission is the same.

In general, two components are structurally identical if they are the same, allowing for manufacturing tolerances. In particular, all physical parameters of the components, such as the dimensions or the material characteristics, conform within the manufacturing tolerances. Structurally identical components are characterized by being interchangeable.

According to embodiments of the invention, the width of the teeth of the planetary gears of the first planetary stage of the first transmission can be smaller than the width of the teeth of the planetary gears of the first planetary stage of the second transmission. This implies that the teeth of the planetary gears in each case have the same width.

The width of a gear tooth refers to its spatial extension in axial direction, that is to say, along an axis of rotation of the gear.

According to embodiments of the invention, the structurally identical planetary carriers of the first planetary stages of the first transmission and of the second transmission are designed in such a manner that they can accommodate both the planetary gears of the first planetary stage of the first transmission and the planetary gears of the first planetary stage of the second transmission. Such a planetary carrier can selectively be fitted with planetary gears that have narrower or wider teeth. On the one hand, it is hereby possible to realize economies of scale. On the other hand, the different width of the teeth allows for a load-specific adaptation of the transmissions.

In analogy to the width of the teeth of the planetary gears, the width of the teeth of the internal gear of the first planetary stage of the first transmission can be smaller than the width of the teeth of the internal gear of the first planetary stage of the second transmission, and/or the width of the teeth of the sun gear of the first planetary stage of the first transmission can be smaller than the width of the teeth of the sun gear of the first planetary stage of the second transmission. It is also possible to use an internal gear of the first planetary stage of the first transmission that is structurally identical to the internal gear of the first planetary stage of the second transmission. In analogy, the sun gears of the first planetary stage of the first transmission and of the first planetary stage of the second transmission can be structurally identical.

In a preferred further development, the planetary gears of the second planetary stage of the first transmission and the planetary gears of the second planetary stage of the second transmission are structurally identical. Consequently, each of the planetary gears can be selectively fitted into the second planetary stage of the first transmission or into the second planetary stage of the second transmission.

The sun gears of the second planetary stage of the first transmission and the sun gears of the second planetary stage of the second transmission are also structurally identical in a preferred further development so that such sun gears can selectively be fitted into the second planetary stage of the first transmission or into the second planetary stage of the second transmission.

In a moreover preferred further development, the internal gears of the second planetary stage of the first transmission and the internal gears of the second planetary stage of the second transmission are structurally identical. The internal gears can consequently also be selectively fitted into the second planetary stage of the first transmission or into the second planetary stage of the second transmission.

In a particularly preferred further development, a third transmission and a fourth transmission are also among the transmissions of the series. The planetary carrier of the first planetary stage of the third transmission and the planetary carrier of the first planetary stage of the fourth transmission are structurally identical.

This implies that the first planetary stage of the third transmission and the first planetary stage of the fourth transmission have a same number of planetary gears. The number of the planetary gears of the first stage of the third transmission is different, however, from the number of the planetary gears of the first planetary stage of the first transmission. Accordingly, the number of the planetary gears of the first planetary stage of the fourth transmission is different from the number of the planetary gears of the first planetary stage of the second transmission. Thus, the first planetary stages of the third transmission and of the fourth transmission, for example, can in each case have four planetary gears, whereas the first planetary stage of the first transmission and the first planetary stage of the second transmission in each case have three planetary gears.

Since each planetary gear is mounted rotatably on exactly one planetary pin, this correspondingly applies to the number of planetary pins in the individual planetary stages.

In analogy to the width proportions of the teeth of the planetary gears of the first planetary stages of the first transmission and of the second transmission, the width of the planetary gears of the first planetary stage of the third transmission is smaller than the width of the teeth of the planetary gears of the first planetary stage of the fourth transmission. Likewise, the width of the teeth of the internal gear of the first planetary stage of the third transmission can be smaller than the width of the teeth of the internal gear of the first planetary stage of the fourth transmission, and/or the width of the teeth of the first planetary stage of the third transmission can be smaller than the width of the teeth of the sun gear of the first planetary stage of the fourth transmission. Alternatively, the teeth of the sun gears and/or of the internal gears of the first planetary stages of the third transmission and of the fourth transmission can have the same width. It is in particular possible to use structurally identical internal gears for the first planetary stage of the third transmission and of the fourth transmission, and/or to use structurally identical sun gears for the first planetary stages of the third transmission and of the fourth transmission.

In a preferred further development, the differences of the first planetary stages of the first transmission and of the third transmission are limited to the planetary carriers and, linked thereto, to the number of planetary gears, planetary pins, and planetary bearings. According to the further development, however, the planetary gears, the sun gears, and/or the internal gears of the first planetary stages of the first transmission and of the third transmission are in each case structurally identical. According to the further development, the planetary gears of the first planetary stage of the first transmission and of the third transmission are thus interchangeable. The sun gears of the first planetary stages of the first transmission and of the third transmission are likewise interchangeable according to the further development, and the internal gears of the first planetary stages of the first transmission and of the third transmission are interchangeable according to the further development.

In a preferred further development, this correspondingly applies to the first planetary stages of the second transmission and of the fourth transmission. The planetary gears, the sun gears, and the internal gears of the first planetary stages of the second transmission and of the fourth transmission are thus in each case structurally identical. This implies that the planetary gears of the first planetary stages of the second transmission and of the fourth transmission are interchangeable. The sun gears of the first planetary stages of the second transmission and of the fourth transmission are likewise interchangeable according to the further development, and the internal gears of the first planetary stages of the second transmission and of the fourth transmission are interchangeable according to the further development.

In a preferred further development, the planetary gears of the second planetary stages of the third transmission and of the fourth transmission are structurally identical. The planetary gears can thus consequently be interchanged within the second planetary stage of the third transmission, within the second planetary stage of the fourth transmission, and between the second planetary stages of the third transmission and of the fourth transmission.

In structurally identical planetary gears of the second planetary stages of the first transmission and of the second transmission, as well as in structurally identical planetary gears of the second planetary stages of the third transmission and of the fourth transmission, the width of the teeth of the planetary gears of the second planetary stages of the first transmission and of the second transmission is different from the width of the planetary gears of the second transmission stages of the third transmission and of the fourth transmission in a preferred further development. This allows for a more precise adaptation of the transmission load capacity to the load conditions that are to be expected.

All planetary carriers of the second stages of the transmissions, in particular, of the first transmission, of the second transmission, of the third transmission, and of the fourth transmission, are structurally identical in a moreover preferred further development. This implies that the numbers of the planetary gears of the second planetary stages of the first transmission, of the second transmission, of the third transmission, and of the fourth transmission conform.

In an additional preferred further development, all internal gears and/or all sun gears of the second planetary stages of the first transmission, of the second transmission, of the third transmission, and of the fourth transmission are also structurally identical.

In a moreover preferred further development, one or more planetary pins of the first planetary stages, one or more planetary pins of the second planetary stages, one or more planetary bearings of the first planetary stages, one or more planetary bearings of the second planetary stages, rotatably mounted planetary carriers of the first planetary stages, and/or planetary carrier bearings of the second planetary stages of the transmissions, in particular, of the first transmission, of the second transmission, of the third transmission, and of the fourth transmission, are also structurally identical.

A preferred embodiment of the invention is illustrated in the FIGURE. The same or functionally equivalent features are designated throughout by the same reference characters. In detail, the following is shown:

The FIGURE shows a transmission series. The series 101 illustrated in the FIGURE comprises a first transmission 103a, a second transmission 103b, a third transmission 103c, and a fourth transmission 103d. Each of the four transmissions 103a, 103b, 103c, and 103d has a first planetary stage 105a, 105b, 105c, 105d and a second planetary stage 107a, 107b, 107c, 107d.

The first planetary stages 105a, 105b, 105c, 105d in each case comprise a planetary carrier 109a, 109b, 109c, 109d, an internal gear 111a, 111b, 111c, 111d, planetary gears 113a, 113b, 113c, 113d, planetary bearings 115a, 115b, 115c, 115d, planetary pins 117a, 117b, 117c, 117d, a sun gear 119a, 119b, 119c, 119d, and a planetary carrier bearing 121a, 121b, 121c, 121d. The planetary gears 113a, 113b, 113c, 113d are mounted rotatably in each case in a planetary pin 117a, 117b, 117c, 117d by means of the planetary bearings 115a, 115b, 115c, 115d. The planetary pins 117a, 117b, 117c, 117d, in turn, are rigidly fixed in the particular first planetary stage 105a, 105b, 105c, 105d. Each planetary gear 113a, 113b, 113c, 113d intermeshes with the sun gear 111a, 111b, 111c, 111d and with the internal gear 111a, 111b, 111c, 111d.

The transmissions 103a, 103b, 103c, 103d in each case have a transmission housing 123a, 123b, 123c, 123d, in which the particular planetary carrier 109a, 109b, 109c, 109d of the first planetary stage 105a, 105b, 105c, 105d is mounted rotatably by means of the appropriate planetary carrier bearing 121a, 121b, 121c, 121d. The internal gears 111a, 111b, 111c, 111d of the first planetary stages 105a, 105b, 105c, 105d are in each case fixed non-rotatably in the transmission housing 123a, 123b, 123c, 123d. The sun gears 119a, 119b, 119c, 119d of the first planetary stages 105a, 105b, 105c, 105d are mounted rotatably.

The second planetary stages 107a, 107b, 107c, 107d are structured analogously. The second planetary stages 107a, 107b, 107c, 107d thus in each case comprise a planetary carrier 125a, 125b, 125c, 125d, an internal gear 127a, 127b, 127c, 127d, planetary gears 129a, 129b, 129c, 129d, planetary bearings 131a, 131b, 131c, 131d, planetary pins 133a, 133b, 133c, 133d, a sun gear 135a, 135b, 135c, 135d, and planetary carrier bearings 137a, 137b, 137c, 137d. The planetary carrier 125a, 125b, 125c, 125d of the second planetary stages 107a, 107b, 107c, 107d is in each case connected non-rotatably to the sun gear 119a, 119b, 119c, 119d of the first planetary stage 105a, 105b, 105c, 105d of the particular transmission 103a, 103b, 103c, 103d and mounted in the particular transmission housing 123a, 123b, 123c, 123d by means of the planetary carrier bearings 137a, 137b, 137c, 137d.

The internal gear 127a, 127b, 127c, 127d of the second planetary stage 107a, 107b, 107c, 107d is connected non-rotatably to the transmission housing 123a, 123b, 123c, 123d. The planetary gears 129a, 129b, 129c, 129d in each case intermesh with the internal gear 127a, 127b, 127c, 127d and with the sun gear 135a, 135b, 135c, 135d of the second planetary stage 107a, 107b, 107c, 107d and are mounted rotatably in a planetary pin 133a, 133b, 133c, 133d in each case by means of a planetary carrier 131a, 131b, 131c, 131d. The planetary pin 133a, 133b, 133c, 133d, in turn, is rigidly fixed in the planetary carrier 125a, 125b, 125c, 125d.

The sun gears 135a, 135b, 135c, 135d of the second planetary stages 107a, 107b, 107c, 107d are in each case mounted rotatably. This can be used to power a downstream spur gear stage, for example, which is not illustrated in the FIGURE.

A range of components is used in a structurally identical manner in all four transmissions 103a, 103b, 103c, 103d. Thus, the planetary bearings 115a, 115b 115c, 115d of the first planetary stages 105a, 105b, 105c 105d are structurally identical; the planetary bearings 131a, 131b, 131c, 131d of the second planetary stages 107a, 107b, 107c, 107d are structurally identical; the planetary pins 107a, 107b, 107c, 107d of the first planetary stages 105a, 105b, 105c, 105d are structurally identical; the planetary pins 133a, 133b, 133c, 133d of the second planetary stages 107a, 107b, 107c, 107d are structurally identical; the internal gears 127a, 127b, 127c, 127d of the second planetary stages 107a, 107b, 107c, 107d are structurally identical; the sun gears 135a, 135b, 135c, 135d of the second planetary stages 107a, 107b, 107c, 107d are structurally identical; the planetary carrier bearings 137a, 137b, 137c, 137d of the second planetary stages 107a, 107b, 107c, 107d are structurally identical; the planetary carriers 125a, 125b, 125c, 125d of the second planetary stages 107a, 107b, 107c, 107d are structurally identical; and the generator-side planetary carrier bearings 121a, 121b, 121c, 121d of the first planetary stages 105a, 105b, 105c, 105d are structurally identical.

Generator-side planetary carrier bearings of the first planetary stages 105a, 105b, 105c, 105d, in contrast, which are not illustrated in the FIGURE, can be adapted to the particular load condition and consequently be specific to the transmission.

The internal gears 111a, 111c, the planetary gears 113a, 113c, and the sun gears 119a, 119c of the first planetary stages 105a, 105c of the first transmission 103a and of the third transmission 103c are in each case designed to be structurally identical. Correspondingly, the sun gears 111b, 111d, the planetary gears 113b, 113d, and the sun gears 119b, 119d of the first planetary stages 105b, 105d of the second transmission 103b and of the fourth transmission 103d are in each case structurally identical.

The first transmission stages 105a, 105b of the first transmission 103a and of the second transmission 103b in each case comprise exactly three planetary gears 113a, 113b.

The first planetary stages 105c, 105d of the third transmission 103c and of the fourth transmission 103d have exactly four planetary gears 113c, 113d.

The width of the individual planetary gears 111a, 111c, 113a, 113c, 119a, 119c comprised in the first transmission stages 105a, 105c of the first transmission 103a and of the third transmission 103c is smaller than the width of the corresponding planetary gears 111b, 111d, 113b, 113d 119b, 119d comprised in the first planetary stages 105b, 105d of the second transmission 103b and of the third transmission 103d. Nevertheless, the planetary carriers 109a, 109b, 109c, 109d are configured in such a manner that they can accommodate both narrow planetary gears 113a, 113c and wide planetary gears 113b, 113d. This makes it possible to use structurally identical planetary carriers 109a, 109b of the first planetary stage 105a, 105b in the first transmission 103a and in the second transmission 103b. Structurally identical planetary carriers 109c, 109d can likewise be used in the first planetary stages 105c, 105d of the third transmission 103c and of the fourth transmission 103d. The additional material costs resulting from this measure are very low. On the other hand though, the adaptation costs for the conversion between the narrow and wide embodiments of the planetary gears can be considerably cut.

The number of the planetary gears 129a, 129b, 129c, 129d in the second planetary stages 107a, 107b, 107c, 107d is in each case exactly three per transmission 103a, 103b, 103c, 103d.

The second planetary stage 107a of the first transmission 103a and the second planetary stage 107b of the second transmission 103b are structurally identical. The second planetary stage 107c of the third transmission 103c and the second planetary stage 107d of the fourth transmission 103d are likewise structurally identical. In particular, the planetary gears 129a, 129b of the second planetary stages 107a, 107b of the first transmission 103a and of the second transmission 103b are structurally identical. Accordingly, the planetary gears 129c, 129d of the second planetary stages 107c, 107d of the third transmission 103c and of the fourth transmission 103d are structurally identical.

Differences exist with regard to the width. The planetary gears 129a, 129b of the second planetary stages 107a, 107b of the first transmission 103a and of the second transmission 103b are narrower than the planetary gears 129c, 129d of the second planetary stages 107c, 107d of the third transmission 103c and of the fourth transmission 103d.

By increasing the number of planetary gears in the first planetary stages 105a, 105b, 105c, 105d from three to four, the load capacity of the particular transmission increases by approximately 20%. An increase of the width in the first planetary stage 105a, 105b, 105c, 105d leads to an increase of the load capacity by approximately 10%.

Due to the limited space available, only three planetary gears 129a, 129b, 129c, 129d are used in the second planetary stages 107a, 107b, 107c, 107d. It is not necessary to increase the number of planetary gears here, since a sufficient adaptation of the second planetary stages 107a, 107b, 107c, 107d to the different variants of the first planetary stages 105a, 105b, 105c, 105d with regard to their load capacity can already be achieved by variations of the width of the planetary gears 129a, 129b, 129c, 129d.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

101 Series
103a First transmission
103b Second transmission
103c Third transmission
103d Fourth transmission
105a First planetary stage
105b First planetary stage
105c First planetary stage
105d First planetary stage
107a Second planetary stage
107b Second planetary stage
107c Second planetary stage
107d Second planetary stage
109a Planetary carrier
109b Planetary carrier
109c Planetary carrier
109d Planetary carrier
111a Internal gear
111b Internal gear
111c Internal gear
111d Internal gear
113a Planetary gear
113b Planetary gear
113c Planetary gear
113d Planetary gear
115a Planetary bearing
115b Planetary bearing
115c Planetary bearing
115d Planetary bearing
117a Planetary pin
117b Planetary pin
117c Planetary pin
117d Planetary pin
119a Sun gear
119b Sun gear
119c Sun gear
119d Sun gear
121a Planetary carrier bearing
121b Planetary carrier bearing
121c Planetary carrier bearing
121d Planetary carrier bearing
123a Transmission housing 123b Transmission housing
123c Transmission housing
123d Transmission housing
125a Planetary carrier
125b Planetary carrier
125c Planetary carrier
125d Planetary carrier
127a Internal gear
127b Internal gear
127c Internal gear
127d Internal gear
129a Planetary gear
129b Planetary gear
129c Planetary gear
129d Planetary gear
131a Planetary bearing
131b Planetary bearing
131c Planetary bearing
131b Planetary bearing
133a Planetary pin
133b Planetary pin
133c Planetary pin
133d Planetary pin
135a Sun gear
135b Sun gear
137c Sun gear
137d Sun gear
139a Planetary carrier bearing
139b Planetary carrier bearing
139c Planetary carrier bearing
139d Planetary carrier bearing

The invention claimed is:

1. A series of transmissions, comprising:
a first transmission,
a second transmission,
a third transmission, and
a fourth transmission;
wherein each of the first, second, third and fourth transmissions has a first planetary stage and a second planetary stage;
wherein the first planetary stage and the second planetary stage in each case have an internal gear, a sun gear, a planetary carrier, and one or more planetary gears;
wherein the planetary carriers of the first planetary stages of the first transmission and of the second transmission are structurally identical;
wherein the planetary carriers of the first planetary stages of the third transmission and of the fourth transmission are structurally identical;
wherein a width of teeth of the planetary gears of the first planetary stage of the first transmission is smaller than a width of teeth of the planetary gears of the first planetary stage of the second transmission;
wherein a number of the planetary gears of the first planetary stage of the first transmission is smaller than a number of planetary gears of the first planetary stage of the third transmission; and
wherein a width of teeth of the planetary gears of the first planetary stage of the third transmission is smaller than a width of teeth of the planetary gears of the first planetary stage of the fourth transmission.

2. The series according to claim 1; wherein the planetary gears of the second planetary stages of the first transmission and of the second transmission are structurally identical.

3. The series according to claim 2; wherein the sun gears of the second planetary stages of the first transmission and of the second transmission are structurally identical.

4. The series according to claim 2; wherein the internal gears of the second planetary stages of the first transmission and of the second transmission) are structurally identical.

5. The series according to claim 4; wherein the planetary gears, the sun gears, and/or the internal gears of the first planetary stages of the first transmission and of the third transmission are in each case structurally identical.

6. The series according to claim 4; wherein the planetary gears, the sun gears, and/or the internal gears of the first planetary stages of the second transmission and of the fourth transmission are in each case structurally identical.

7. The series according to the preceding three claim 4; wherein the planetary gears of the second planetary stages of the third transmission and of the fourth transmission are structurally identical.

8. The series according to claim 7; wherein a width of teeth of the planetary gears of the second planetary stages of the first transmission and of the second transmission is different from a width of teeth of the planetary gears of the second planetary stages of the third transmission and of the fourth transmission.

9. The series according to claim 1; wherein all planetary carriers of the second planetary stages of the transmissions are structurally identical.

10. The series according to claim 1; wherein all internal gears of the second planetary stages of the transmissions are structurally identical.

11. The series according to one of the preceding claim 1; wherein all sun gears of the second planetary stages of the transmissions are structurally identical.

12. The series according to claim 1; wherein the first planetary stage has one or more planetary pins; and
wherein all planetary pins of the first planetary stages of the transmissions are structurally identical.

13. The series according to claim 1; wherein the second planetary stage has one or more planetary pins; and
wherein all planetary pins of the second planetary stages of the transmissions are structurally identical.

14. The series according to claim 1; wherein the first planetary stage has one or more planetary bearings; and
wherein the planetary bearings of the first planetary stages of the transmissions are structurally identical.

15. The series according to one of the preceding claim 1; wherein the second planetary stage has one or more planetary bearings; and
wherein the planetary bearings of the second planetary stages of the transmissions are structurally identical.

16. The series according to one of the preceding claim 1; wherein the first planetary stage has at least one planetary carrier bearing; and
wherein the planetary carrier bearings of the first planetary stages of the transmissions are structurally identical.

17. The series according to one of the preceding claim 1; wherein the second planetary stage has at least one planetary carrier bearing; and
wherein the planetary carrier bearings of the second planetary stages of the transmissions are structurally identical.

* * * * *